United States Patent [19]
Shiflett et al.

[11] Patent Number: 5,619,604
[45] Date of Patent: Apr. 8, 1997

[54] MULTI-FIBER OPTICAL CONNECTOR

[75] Inventors: Elbert O. Shiflett, Simpsonville, S.C.; James M. Wittes, Bernardsville, N.J.

[73] Assignee: Alcoa Fujikura Limited, Brentwood, Tenn.

[21] Appl. No.: 607,063

[22] Filed: Feb. 26, 1996

[51] Int. Cl.$^6$ .................................................. G02B 6/38
[52] U.S. Cl. ........................... 385/59; 385/55; 385/60; 385/64; 385/71; 385/72; 385/77; 385/78; 385/82; 385/52
[58] Field of Search .......................... 385/53, 55, 56, 385/59, 62, 65, 64, 71, 72, 60, 77, 78, 82, 52, 139

[56] References Cited

U.S. PATENT DOCUMENTS

| | | | |
|---|---|---|---|
| 4,762,388 | 8/1988 | Tanaka et al. | 385/59 X |
| 5,028,114 | 7/1991 | Krausse et al. | 385/53 X |
| 5,091,991 | 2/1992 | Briggs et al. | 385/82 |
| 5,138,679 | 8/1992 | Edwards et al. | 385/90 |
| 5,157,749 | 10/1992 | Briggs et al. | 385/60 |
| 5,333,221 | 7/1994 | Briggs et al. | 385/55 |
| 5,381,498 | 1/1995 | Bylander | 385/83 |
| 5,404,416 | 4/1995 | Iwano et al. | 385/60 |
| 5,422,971 | 6/1995 | Honjo et al. | 385/80 |
| 5,537,501 | 7/1996 | Iwano et al. | 385/58 |

*Primary Examiner*—Brian Healy
*Attorney, Agent, or Firm*—Tracey D. Beiriger

[57] ABSTRACT

A connector using an multi-fiber ferrule, such as the MT ferrule or similar ferrule, that can be plugged into and received by an optical receptacle. Multiple alignment features help align and mate the connector to another multi-fiber object. The connector has a guide prong or forward extension beneath which is mounted the ferrule. The prong provides a reference surface that functions as a precise pre-alignment mechanism for the ferrule. Also, the prong has a groove that mates with a corresponding rail of the receptacle when the connector is plugged into the receptacle ensuring that the connector is properly seated within the receptacle. Further, the ferrule has apertures that align with and receive guide pins of the lightguide means or active device.

5 Claims, 4 Drawing Sheets

MULTI-FIBER OPTICAL CONNECTOR

BACKGROUND OF THE INVENTION

1. Field of the Invention

This invention pertains to a fiber optic connector employing a multi-fiber ferrule such as a Mechanical Transfer (MT) ferrule or similar type ferrule that will mate with an optical transceiver, which transceiver is the subject of a U.S. patent application Ser. No. 08/607,062, bending, being filed concurrently herewith entitled "Receptacle for Multi-Fiber Connector" and assigned to a common assignee.

2. Technology Review

Fiber optic cables are typically joined to one another or connected to active, light emitting or receiving devices, and often, multiple optical fibers must be simultaneously coupled. Further, it is often difficult to properly align abutting fibers or to align such fibers to active devices, such as light sources or light sensors. If misalignment occurs, light passing through the connection will be attenuated and transmission quality degraded.

In instances where a multi-fiber connector is used and the active device is configured in an array containing many such devices, an intermediate lightguide means can be used for aligning and mating the active devices to the connector at the end of the optical fibers. Lightguide means, as used herein, is typically a block of plastic or glass material provided with minute holes or light pipes extending through the block for conducting light from one end of the block to the other. The minute holes or light pipes of the lightguide means align with the optical fibers of the connector. Lightguide features can also be used to align and mate together two multi-fiber cables.

Optical cable fibers can be fitted with a ferrule which houses or encapsulates the fiber ends and aids in aligning the fibers. The ferrule also helps to protect the fibers from damage especially during the processes of connecting and disconnecting. One of the commonly used connector ferrules is the Mechanical Transfer (MT) ferrule. The MT ferrule is a multi-fiber device typically used to simultaneously connect multiple fibers.

Currently, a common multi-fiber connector does not exist that uses the MT ferrule and that can connect into an optical transceiver. Other multi-fiber connectors employing a ferrule, such as the mechanical transfer plug (MTP) and the multiple access connector (MAC) are used for multi-fiber terminations. Such devices are not cost effective to manufacture because their components are generally tubular and must be threaded onto the ferrule-cable subassembly. Also, the MTP and the MAC are not as compact as needed for some applications such as high density back planes. Further, transceivers capable of mating with either the MTP or MAC are not available.

It is, therefore, desirable to provide a connector employing an MT ferrule or similar type multi-fiber ferrule that can be received by a transceiver and aligned and mated with a lightguide means or with an active optical device therein or mated with another multi-fiber object.

It is a general objective of the present invention to provide a connector employing an MT ferrule or similar type multi-fiber ferrule that is compact and cost effective.

It is another objective of the invention to provide a connector that permits pre-alignment of the ferrule.

It is yet another objective of the invention to provide a connector that has a low, flat profile, and is accommodating and easy to use on a circuit board.

A further objective of the invention is to provide a connector that has multiple alignment features for assuring proper mating of the ferrule and the lightguide means or the active device.

Yet another objective of the invention is to provide a connector employing an MT ferrule or similar type multi-fiber ferrule that fits into a transceiver in a predetermined orientation.

SUMMARY OF THE INVENTION

The invention is directed to a connector using an multi-fiber ferrule, such as the MT ferrule or similar type multi-fiber ferrule, that can be mated with and received by an optical receptacle. Multiple alignment features help align and mate the connector to another multi-fiber object. The connector has a guide prong or forward extension beneath which is mounted the ferrule. The prong provides a reference surface that functions as a precise pre-alignment mechanism for the ferrule. Also, the prong has a groove that mates with a corresponding rail or rib of the receptacle when the connector is plugged into the receptacle ensuring that the connector maintains proper alignment with the receptacle. Further, the ferrule has precision apertures or other features that align with and receive precision guide pins or align with complimentary features of the lightguide means or active device.

The connector has a latching means that permits it to operate as a push pull device, i.e., the connector only needs to be pushed into the receptacle and the latching means engages corresponding projections on the receptacle to lock the connector in place. The connector is removed from the receptacle by simply pulling it back.

The connector is also pull-proof in that the ferrule and the contained optical fibers are not affected by typical tugging on the cable itself. This maintains a good connection and thus provides a high, constant level of transmission of the light through the optical fibers as long as the connector is not actually pulled out of the receptacle.

Further, the connector has a low, flat profile making it ideal for use on or at the edge of a circuit board. The connector can be assembled mostly in a clamshell fashion, and because of this, is amenable to automation in building the connector.

BRIEF DESCRIPTION OF THE DRAWINGS

The advantages, nature and additional features of the invention will become more apparent from the following description, taken in connection with the accompanying drawings in which.

DETAILED DESCRIPTION OF PREFERRED EMBODIMENTS

Figure 1:
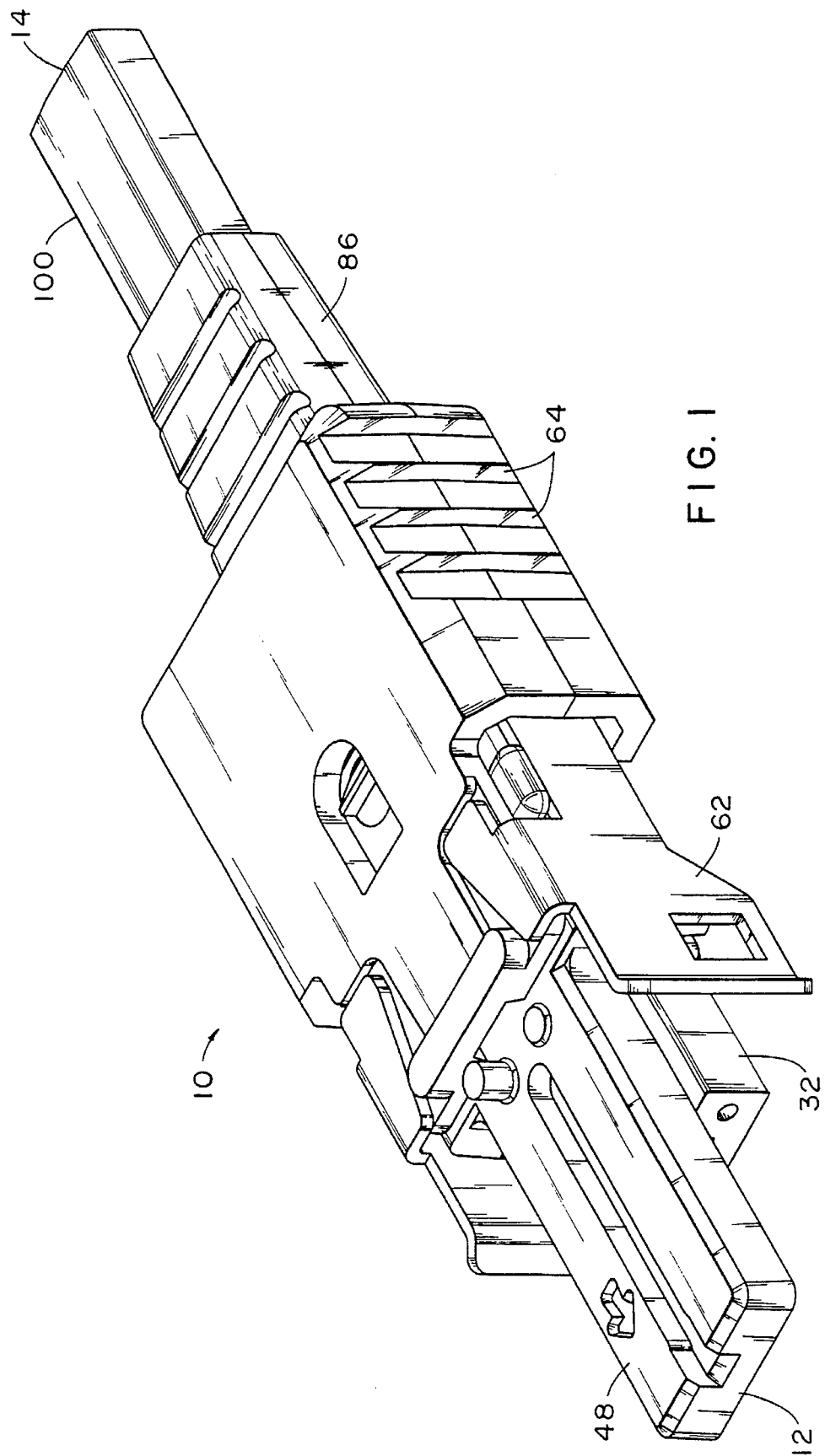
FIG. 1 is a perspective view of the connector of the invention.

Referring to FIG. 1, a perspective view of connector 10 of the present invention is shown. The connector has a front end 12 for insertion into a receptacle 16 (FIG. 4) and a rear end 14 for receiving a jacketed cable 100.

Figure 2:
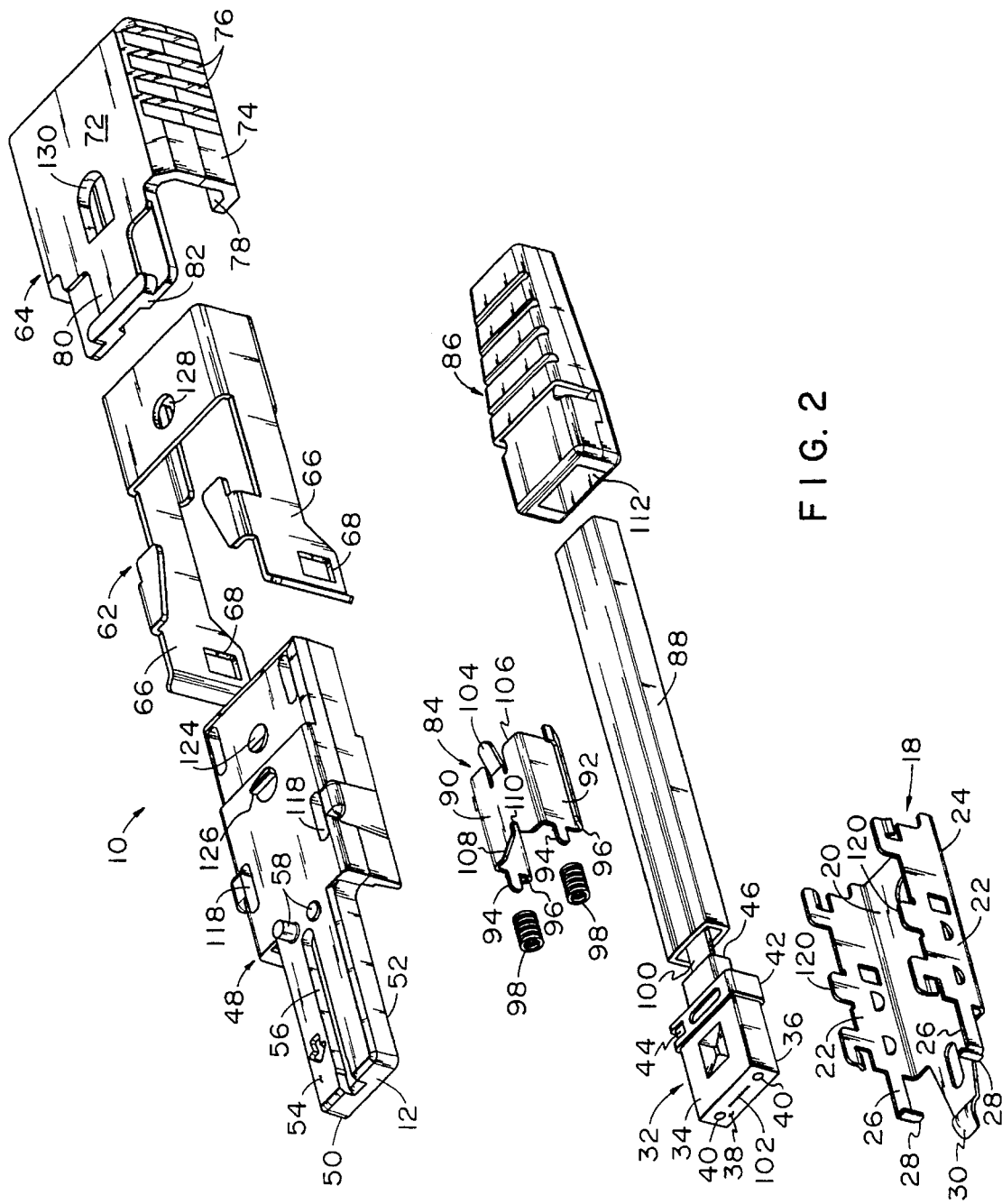
FIG. 2 is an exploded assembly view of the connector of FIG. 1.

FIG. 2 depicts an exploded assembly view of connector 10. The connector has a generally U-shaped enclosure or lower plate 18, which includes a center wall 20 and an integral pair of parallel side walls 22. Side walls 22 extend from longitudinal edges 24 of center wall 20 and have an integral pair of opposing resilient spring fingers 26 extending in a longitudinal forward direction therefrom. Fingers 26 are provided with inwardly turned ends 28.

Enclosure 18 also has an integral resilient spring tab 30 extending longitudinally from center wall 20. Enclosure 18 also has a pair of locating tabs 120 extending laterally from side wall 22. The tabs 120 are for securing enclosure 18 to the connector body 48 as discussed below. Enclosure 18 is preferably made of a sheet metal material but may be made of thermoplastic material.

The connector 10 also includes a ferrule 32 which has an upper surface 34 and a lower surface 36. In addition, ferrule 32 has a front surface 38 with at least two apertures 40 for receiving guide pins (not shown) from another multi-fiber device (not shown). Fibers 102 of cable 100 are apparent from front surface 38 of ferrule 32. Further, ferrule 32 has an integral shoulder 42 on its rear portion 44 which is grasped by finger ends 28 of enclosure 18 when positioned between fingers 26 of the enclosure. Spring tab 30 of enclosure 18 abuts lower surface 36 of ferrule 32 when in such position. Opposite the front surface 38, ferrule 32 has a rear surface 46 for receiving the optical fibers of cable 100 and which run longitudinally through the ferrule and terminate at the front surface 38. Optical fibers 102 enclosed by cable 100 are aligned at the front surface 38 of the ferrule for mating with a second multi-fiber object.

Connector 10 can be mated to various multi-fiber objects. The apertures 40 of ferrule 32 can be fitted with guide pins to enable connector 10 to be received by multi-fiber objects requiring male mating ferrules.

Figure 3:
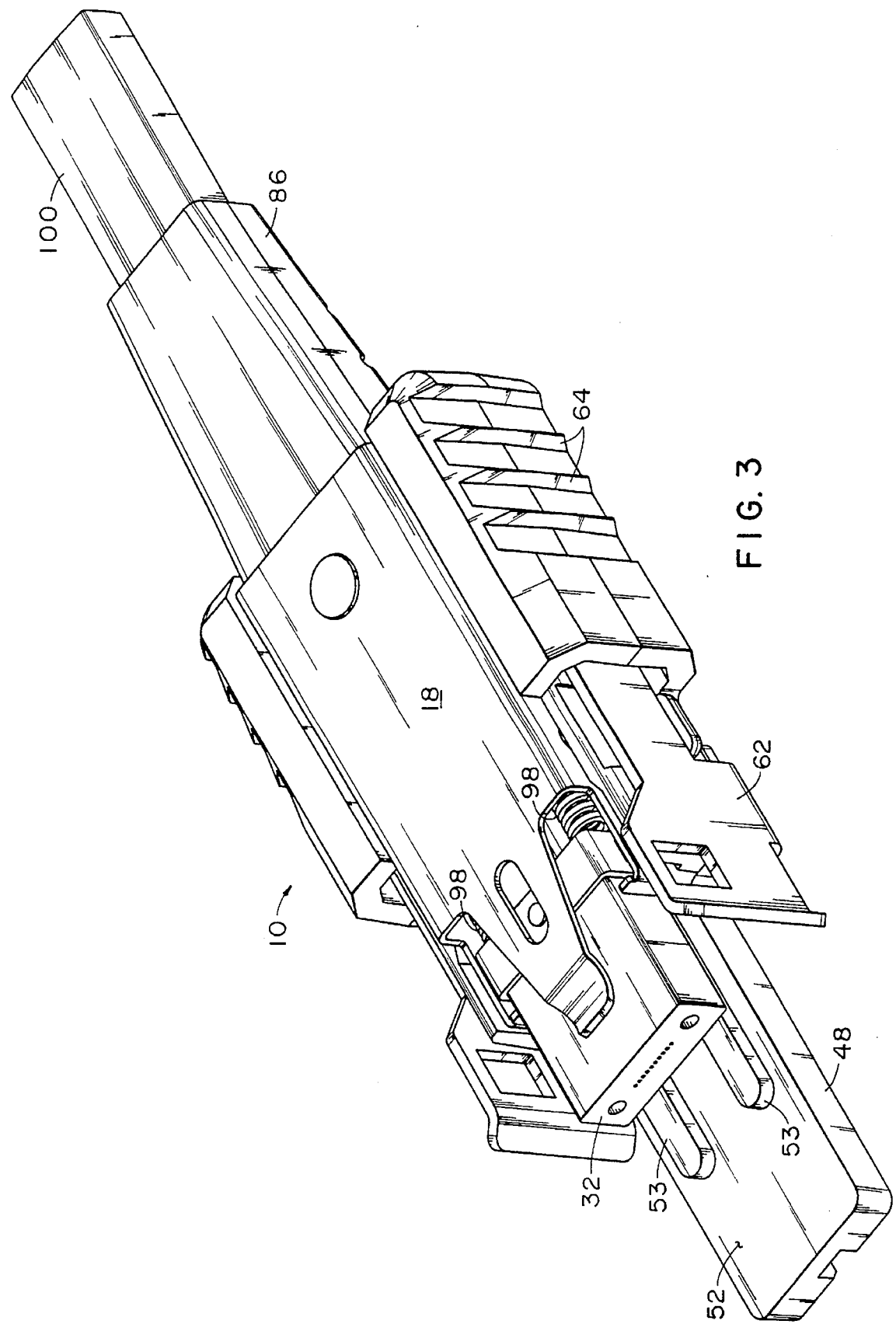
FIG. 3 is a perspective view of the underside of the connector of FIG. 1.

Connector body 48 includes resilient guide prong 50, as shown in FIGS. 2 and 3, which provides a reference surface 52 for receiving ferrule 32. Reference surface 52 is provided with ribs 53 which help strengthen prong 50. Reference surface 52 engages upper surface 34 of the ferrule 32 while the spring tab 30 of enclosure 18 engages lower surface 36 of the ferrule and forces it against reference surface 52.

Figure 4:
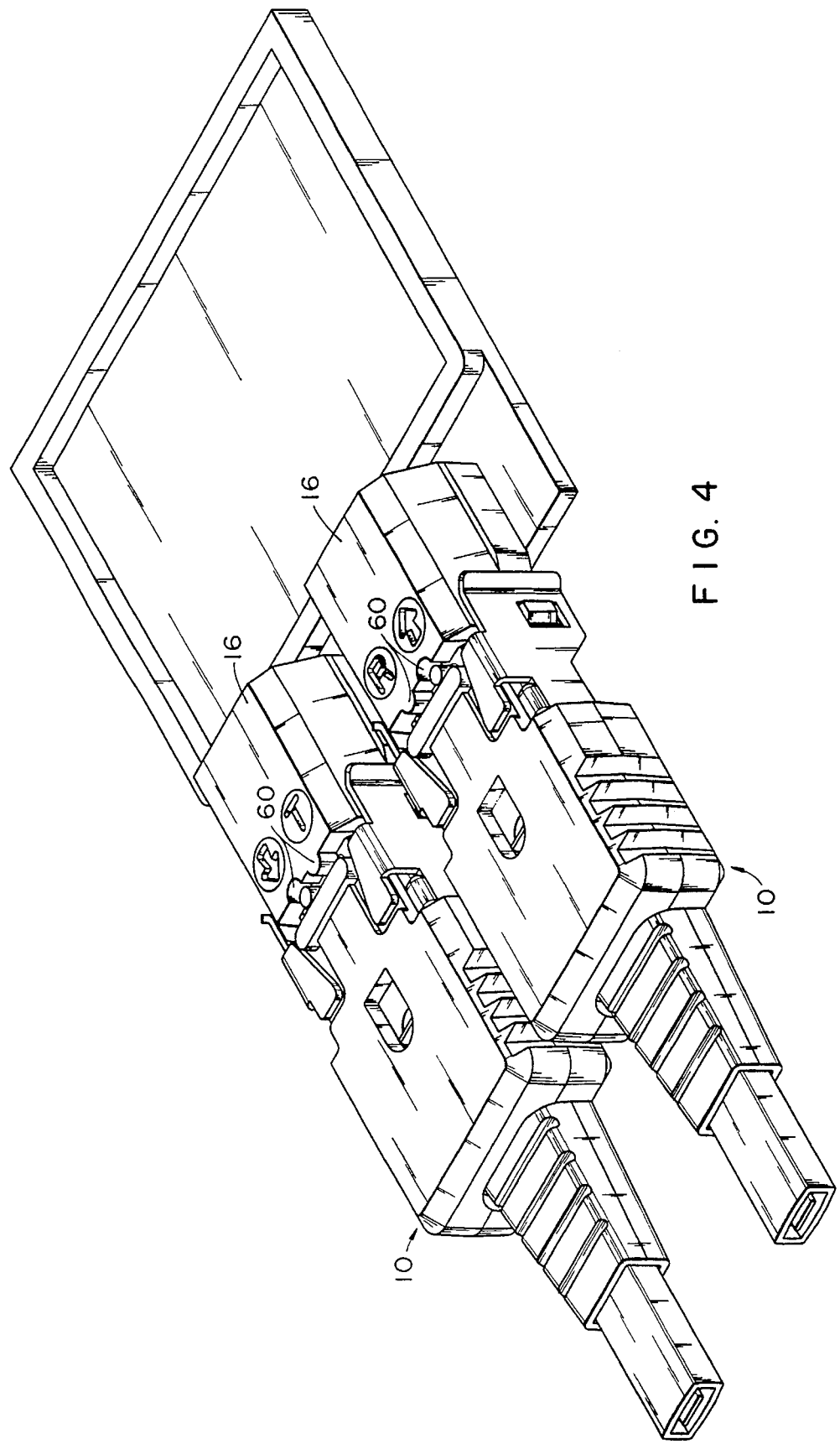
FIG. 4 is a perspective view of the connector plugged into a receptacle.

Prong 52 includes an upper surface 54 opposite reference surface 52. Upper surface 54 has a longitudinal groove 56 extending from the front end 10 to the mid-region of body 48. When connector 10 is inserted into receptacle 16, groove 56 receives a corresponding rail (not shown) in the upper chamber (not shown) of the receptacle (FIG. 4). Keying means 58 corresponding to receptacle keying means 60 is also provided on upper surface 54 of the mid-region of the connector body 48 near the end of groove 56. Keying means 58 enables a connector to mate with a receiver receptacle or a transmitter receptacle.

Connector body 48 is provided with pockets 118 for receiving locating tabs 120 of enclosure 18. Connector body 48 is also provided with projections 124 and 126 for engaging other connector parts as described below. Connector body 48 is a plastic molded piece.

Connector 10 also includes a latching means 62 and a slide means 64. The latching means is provided with holes 128 and is configured to engage the rear portion of body 48. Projections 124 of the body 48 and holes 128 of the latching means engage and lock the latching means and body together. Latching means 62 has a pair of generally spring-like parallel arms 66 extending longitudinally forward from the front end 12 of the connector 10. Arms 66 have notches 68 corresponding to projections 70 (FIG. 4) of receptacle 16 such that the notches engage and lock onto the projections when the connector is inserted into the receptacle. The latching means permits the connector to operate as a push pull device, i.e., the connector only needs to be pushed into the receptacle and the latching means mates with the corresponding projections on the receptacle to lock the connector in place. The connector may be removed from the receptacle by simply pulling the slide means back.

Slide means 64 is a C-shaped component and has a center wall 72 and longitudinal dependent parallel side walls 74. Center wall 72 is provided a slot 130 for engaging projection 126 of the connector body 48. The slot 130 is configured to permit push-pull slide motion. Side walls 74 have a textured outer surface 76 and inwardly directed longitudinal edges 78 that extend generally parallel to the plane of center wall 72. Slide means 64 also has a tongue 80 extending from its forward end 82 to engage and interlock with the latching means 62. Textured outer surface 76 provides a means to grip the connector when connecting and disconnecting the connector. The slide is preferably a plastic molded piece while the latch can be made of metal or plastic.

The connector 10 further includes a saddle member 84, a cable strain relief boot 86 and a plastic jacket 88. The saddle member 84 has a center wall 90 and longitudinal depending parallel side walls 92. A pair of integral fingers 94 extend longitudinally from the front end 96 of side wall 92. Coil spring means 98 seat on fingers 94 such that when the saddle 84 abuts ferrule 32, the spring means forces the ferrule against the inwardly turned ends 28 of the fingers 26 of the enclosure 18.

The center wall 90 of saddle 84 has an integral tie-off tab 104 for crimping aramid yarn (not shown) that surrounds and helps protect the cable 100. Tab 104 is located at the rear end 106 of the center wall 90 and extends rearwardly and longitudinally therefrom. Further, at the front end of center wall 90 there is V cut-out 108 with a notch 110 in which the aramid yarn is pulled tightly through before being wrapped around tab 104. Thus, the tie-off can be crimped in one step and no epoxy is necessary.

Saddle 84 engages and interlocks with enclosure 18. Saddle 84 is preferably made of sheet metal.

Cable 100 includes an outer plastic or PVC casing 88 that protects the optical fibers from damage. Strain (bend) relief boot 86 has opening 112 which is configured to receive and slide over casing 88. Boot 86 is engaged partially by enclosure 18 and partially by connector body 48. Boot 86, casing 88, aramid and saddle 84 all act together to make the connector pull-proof. Further, because the ferrule is spring loaded for a constant snug fit, the optical fibers are isolated from pull on the cable jacket when the connector is engaged with the receptacle. Thus, the ferrule and optical fibers are not affected by typical tugging on the cable jacket. This insures constant, high level transmission of the light through the optical fibers as long as the connector is not actually disengaged from the receptacle.

One of the key features of this invention is the resilient pre-positioning of the ferrule 32 on connector 10 which guarantees a mate with the multi-fiber object in the lower chamber of the receptacle. Maximum pre-alignment tolerances of 0.005 to 0.010 inch between the ferrule and its mating multi-fiber object must be maintained. The multiple guiding features provide such tolerances. The body 48 and enclosure 18 help to place the ferrule in position to be aligned with the guide pins of a multi-fiber object, such as a lightguide means, so that the optical fibers 102 can be aligned with the active devices. Because the ferrule 32 lies flat against the prong 50, as long as the prong goes straight into the receptacle, the ferrule will be aligned properly. Further, the groove 56 on prong 50 corresponding to a rail in the receptacle 16 helps to assure that the prong is inserted and positioned properly within the receptacle. When the connector is plugged into the receptacle, the connector is easily fitted to the receptacle in a predetermined orientation to eliminate an alignment error and insure high optical signal transmission characteristics between the optical fibers and the active device.

The connector is quite small and very compact being only approximately 1½ inch long and ⅝ inch wide. Because of its compactness and its flat lower surface, the connector is accommodating and easy to use on a circuit board. Further, because most of the parts of the connector are generally U-shaped, a clamshell type assembly process can be used and thus the connector can be assembled using automation techniques. Unlike most fiber optic connectors, only the boot must be threaded onto the cable prior to attaching the ferrule to the fibers. Thus, the critical part of the fabrication process, i.e., the joining and bonding of the ferrule to the optical fibers can be performed totally independent of the assembly process.

FIG. 4 depicts a receiver connector and a transmitter connector simultaneously plugged into corresponding receptacles mounted to a circuit board. In some instances, there may be a need for only one of these connectors. It is not intended for the invention to include only the simultaneous use of the two connectors but to also include the sole use of either the receiver connector or the transmitter connector.

Having described the presently preferred embodiments, it is to be understood that the invention may be otherwise embodied within the scope of the appended claims.

What is claimed is:

1. A multi-fiber optical connector having a front end and a rear end and comprising:

a generally U-shaped enclosure having a center wall and an integral pair of depending side walls extending from the center wall in a generally parallel fashion from longitudinal edges of said center wall, said enclosure having an integral pair of fingers with inwardly turned ends extending longitudinally from said side walls, and an integral spring tab extending longitudinally from said center wall, said fingers and said tab located at the front end of said connector;

a ferrule having a front surface with at least two apertures for receiving two guide pins from a second multi-fiber object, said ferrule having an upper surface and a lower surface, said ferrule in addition having opposed side surfaces positioned between the fingers of said U-shaped enclosure; and a connector body having a guide prong providing a reference surface for engaging the upper surface of the ferrule while the tab of said U-shaped enclosure engages the lower surface of the ferrule and forces it against the reference surface of said prong.

2. A connector as in claim 1 wherein said ferrule is a mechanical transfer ferrule.

3. A multi-fiber optical connector as in claim 1 for insertion into a receptacle, said connector further comprising:

a latching means configured to engage said connector body, said latching means having arms with notches corresponding to projections on said receptacle such that said notches engage and lock onto said projections when said connector is inserted into said receptacle; and a slide means having a forward end and center wall with side walls extending in a general parallel fashion from longitudinal edges of the center wall, said side walls having a textured outer surface and inwardly directed longitudinal edges extending in a generally parallel direction to the plane of the center wall, said slide means having in addition a tongue extending from the forward end of said center wall, said tongue engaging said latch and said slide engaging said connector body.

4. A connector as in claim 1 wherein said connector further comprises:

a saddle member, said member having center and side walls extending in a generally parallel fashion from longitudinal edges of said center wall, said side walls having an integral pair of fingers extending longitudinally from a front end of said side walls;

coil spring means seated on said fingers, said center wall having an integral strength member tie-off tab extending longitudinally from the rear end of said center wall, said saddle member abutting said ferrule such that said spring means forces said ferrule against the inwardly turned ends of the fingers of the U-shaped enclosure.

5. A connector as in claim 3 wherein said connector houses one end of a fiber optic cable and an end portion of a plastic jacket encasing said cable, said connector further comprising:

a strain relief boot encasing the end portion of said plastic jacket, said boot being engaged by said enclosure and said connector body.

* * * * *